United States Patent
Naribole et al.

(10) Patent No.: US 12,160,824 B2
(45) Date of Patent: *Dec. 3, 2024

(54) SYSTEMS AND METHODS FOR MANAGING POWER USAGE OF A MULTI-LINK DEVICE EQUIPPED WITH A PLURALITY OF RADIO INTERFACES

(71) Applicant: Samsung Electronics Co., Ltd., Suwon-si (KR)

(72) Inventors: Sharan Naribole, San Jose, CA (US); Srinivas Kandala, Morgan Hill, CA (US); Wook Bong Lee, San Jose, CA (US); Ashok Ranganath, Los Gatos, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 13 days.

This patent is subject to a terminal disclaimer.

(21) Appl. No.: 18/199,219

(22) Filed: May 18, 2023

(65) Prior Publication Data

US 2023/0292240 A1  Sep. 14, 2023

Related U.S. Application Data

(63) Continuation of application No. 17/159,760, filed on Jan. 27, 2021, now Pat. No. 11,690,012.

(Continued)

(51) Int. Cl.
*H04W 76/15* (2018.01)
*H04W 52/02* (2009.01)

(52) U.S. Cl.
CPC ... *H04W 52/0222* (2013.01); *H04W 52/0235* (2013.01); *H04W 52/0283* (2013.01)

(58) Field of Classification Search
CPC . H04W 24/02; H04W 72/0453; H04W 76/15; H04W 88/06; H04W 84/12;
(Continued)

(56) References Cited

U.S. PATENT DOCUMENTS 9,425,985 B1 *  8/2016  Shousterman .......... H04L 67/61
9,735,861 B2     8/2017  Kim et al.
(Continued)

FOREIGN PATENT DOCUMENTS

EP   0615364 A1   9/1994
EP   3291611 A1   3/2018
(Continued)

OTHER PUBLICATIONS

EPO European Office Action dated Mar. 15, 2023, issued in corresponding European Patent Application No. 21157372.0 (7 pages).
(Continued)

*Primary Examiner* — Cindy Trandai
(74) *Attorney, Agent, or Firm* — Lewis Roca Rothgerber Christie LLP

(57) ABSTRACT

Systems and methods for managing use of power of a wireless communication device configured to communicate over a plurality of radio links. A criterion is detected, and one of the plurality of radio links is selected as a selected radio link based on detecting the criterion. Operation of the selected radio link is switched from a first operating mode to a second operating mode, and operation of one or more remaining radio links of the plurality of radio links is disabled. In response to switching operation of the selected radio link to the second operating mode, the selected radio link oscillates between an awake state and an asleep state. Radio traffic information for the plurality of radio links is received, via the selected radio link, during the awake state.

18 Claims, 6 Drawing Sheets

Related U.S. Application Data

(60) Provisional application No. 62/989,422, filed on Mar. 13, 2020.

(58) Field of Classification Search
CPC ......... H04W 52/0222; H04W 52/0235; H04W 52/0283; H04W 52/028; H04W 52/0209; H04W 52/0203; H04W 52/0258; H04W 28/0221; H04W 52/0261; H04W 4/80; H04W 4/06; H04W 76/14; Y02D 30/70; H04L 45/24

See application file for complete search history.

(56) References Cited

U.S. PATENT DOCUMENTS

| | | | |
|---|---|---|---|
| 2007/0189168 A1 | 8/2007 | Yao | |
| 2008/0222716 A1* | 9/2008 | Momoi | H04L 43/0811 |
| | | | 726/11 |
| 2009/0163254 A1 | 6/2009 | Chandra et al. | |
| 2009/0276646 A1* | 11/2009 | Woo | H04W 76/27 |
| | | | 709/225 |
| 2010/0165997 A1* | 7/2010 | Matsumoto | H04L 45/02 |
| | | | 370/400 |
| 2011/0103246 A1 | 5/2011 | Byun | |
| 2012/0084446 A1* | 4/2012 | Iinuma | H04W 36/0079 |
| | | | 709/227 |
| 2012/0120892 A1 | 5/2012 | Freda et al. | |
| 2014/0269468 A1 | 9/2014 | Jia et al. | |
| 2014/0315491 A1 | 10/2014 | Preiszler et al. | |
| 2015/0139156 A1 | 5/2015 | Thakur et al. | |
| 2016/0337223 A1 | 11/2016 | Mackay | |
| 2017/0013555 A1 | 1/2017 | Park et al. | |
| 2017/0280438 A1* | 9/2017 | Balachandran | H04W 76/10 |
| 2017/0325102 A1 | 11/2017 | Casebolt et al. | |
| 2018/0206190 A1* | 7/2018 | Cherian | H04L 1/1621 |
| 2019/0158385 A1 | 5/2019 | Patil et al. | |
| 2019/0158413 A1 | 5/2019 | Patil et al. | |
| 2019/0297571 A1 | 9/2019 | Jose et al. | |
| 2020/0163141 A1 | 5/2020 | Hsu et al. | |
| 2020/0186413 A1* | 6/2020 | Subagio | H04L 43/16 |
| 2020/0245249 A1 | 7/2020 | Medles et al. | |
| 2020/0280827 A1 | 9/2020 | Fechtel et al. | |
| 2022/0400435 A1* | 12/2022 | Dong | H04W 52/028 |
| 2023/0016684 A1* | 1/2023 | Li | G06F 13/4221 |
| 2023/0046270 A1* | 2/2023 | Huang | H04L 1/22 |

FOREIGN PATENT DOCUMENTS

| | | |
|---|---|---|
| WO | WO 2013/008989 A1 | 1/2013 |
| WO | WO 2015/122600 A1 | 8/2015 |

OTHER PUBLICATIONS

EPO Extended European Search Report dated Jul. 26, 2021, issued in corresponding European Patent Application No. 21157372.0 (10 pages).

* cited by examiner

SYSTEMS AND METHODS FOR MANAGING POWER USAGE OF A MULTI-LINK DEVICE EQUIPPED WITH A PLURALITY OF RADIO INTERFACES

CROSS-REFERENCE TO RELATED APPLICATION(S)

The present application is a continuation of U.S. patent application Ser. No. 17/159,760, filed Jan. 27, 2021, which claims priority to and the benefit of U.S. Provisional Application No. 62/989,422, filed Mar. 13, 2020, entitled "MULTI-LINK POWER SAVE," the entire content of each of which is incorporated herein by reference.

FIELD

One or more aspects of embodiments according to the present disclosure relate to wireless networks, and more particularly, to managing power usage of a multi-link device that is configured to receive and transmit data frames over multiple radio links.

BACKGROUND

Wireless communication may be conducted via one or more communication channels of a wireless network. The wireless communication may adhere to a wireless network protocol such as, for example, the protocol used for Wi-Fi devices that is based on an Institute of Electrical and Electronics Engineers' (IEEE) 802.11 family of standards. The wireless network protocol may allow a device to use of multiple (e.g. two or more) radio links to transmit data over the wireless network. A device that uses multiple radio links may consume more power than a device that uses a single link. Accordingly, it is desirable to manage power consumption of a device that uses multiple radio links.

The above information disclosed in this Background section is only for enhancement of understanding of the background of the present disclosure, and therefore, it may contain information that does not form prior art.

SUMMARY

An embodiment of the present disclosure is directed to a method for managing use of power of a wireless communication device configured to communicate over a plurality of radio links. The method includes detecting a criterion and selecting one of the plurality of radio links as a selected radio link based on detecting the criterion. The method further includes switching operation of the selected radio link from a first operating mode to a second operating mode, and disabling operation of one or more remaining radio links of the plurality of radio links. In response to switching operation of the selected radio link to the second operating mode, the selected radio link oscillates between an awake state and an asleep state. Radio traffic information for the plurality of radio links is received, via the selected radio link, during the awake state.

According to one embodiment, the criterion is amount of radio traffic associated with one or more of the plurality of radio links.

According to one embodiment, the selecting of the one of the plurality of radio links is based on a selection algorithm executed by the wireless communication device.

According to one embodiment, the selecting of the one of the plurality of radio links is based on a recommendation from a second device.

According to one embodiment, the radio traffic information includes information on buffered radio traffic.

According to one embodiment, the first operating mode is an active mode wherein the plurality of radio links remain active for receiving and transmitting radio traffic.

According to one embodiment, the method for managing use of power further includes, in response to switching operation of the selected radio link from the first operating mode to the second operating mode, mapping a type of radio traffic to the selected radio link.

According to one embodiment, the method for managing use of power further includes detecting a second criterion, and switching operation of the selected radio link and the one or more remaining radio links to the first operating mode based on detecting the second criterion. The second criterion may be an amount of radio traffic associated with one or more of the plurality of radio links, wherein the first operating mode is an active mode for keeping the selected radio link and the one or more remaining radio links active for receiving and transmitting radio traffic.

According to one embodiment, the plurality of radio links are Wi-Fi radio links, and the one or more remaining radio links that are disabled for operation are all of the plurality of radio links except for the selected radio link.

An embodiment of the present disclosure is also directed to an apparatus for managing use of power. The apparatus includes a processor and a memory coupled to the processor. The memory stores computer instructions that, when executed by the processor, cause the processor to: detect a criterion; select one of a plurality of radio links as a selected radio link based on detecting the criterion; switch operation of the selected radio link from a first operating mode to a second operating mode, and disable operation of one or more remaining radio links of the plurality of radio links; in response to switching operation of the selected radio link to the second operating mode, oscillate the selected radio link between an awake state and an asleep state; and receive, via the selected radio link, during the awake state, radio traffic information for the plurality of radio links.

An embodiment of the present disclosure is further directed to a system for managing use of power. The system includes a responding processor and a transmitting processor. The responding processor is configured to: detect a criterion; select one of the plurality of radio links as a selected radio link based on detecting the criterion; switch operation of the selected radio link from a first operating mode to a second operating mode, and disable operation of one or more remaining radio links of the plurality of radio links; and in response to switching operation of the selected radio link to the second operating mode, oscillate the selected radio link between an awake state and an asleep state. The transmitting processor configured to: receive information on the selected radio link; retrieve radio traffic information for the plurality of radio links; and transmit the radio traffic information on the selected radio link.

As a person of skill in the art should recognize, the claimed embodiments help manage power consumption of a multi-link device. Managing power consumption may be desirable for a battery-operated client that may want to maximize its battery life.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

DETAILED DESCRIPTION

Figure 1:
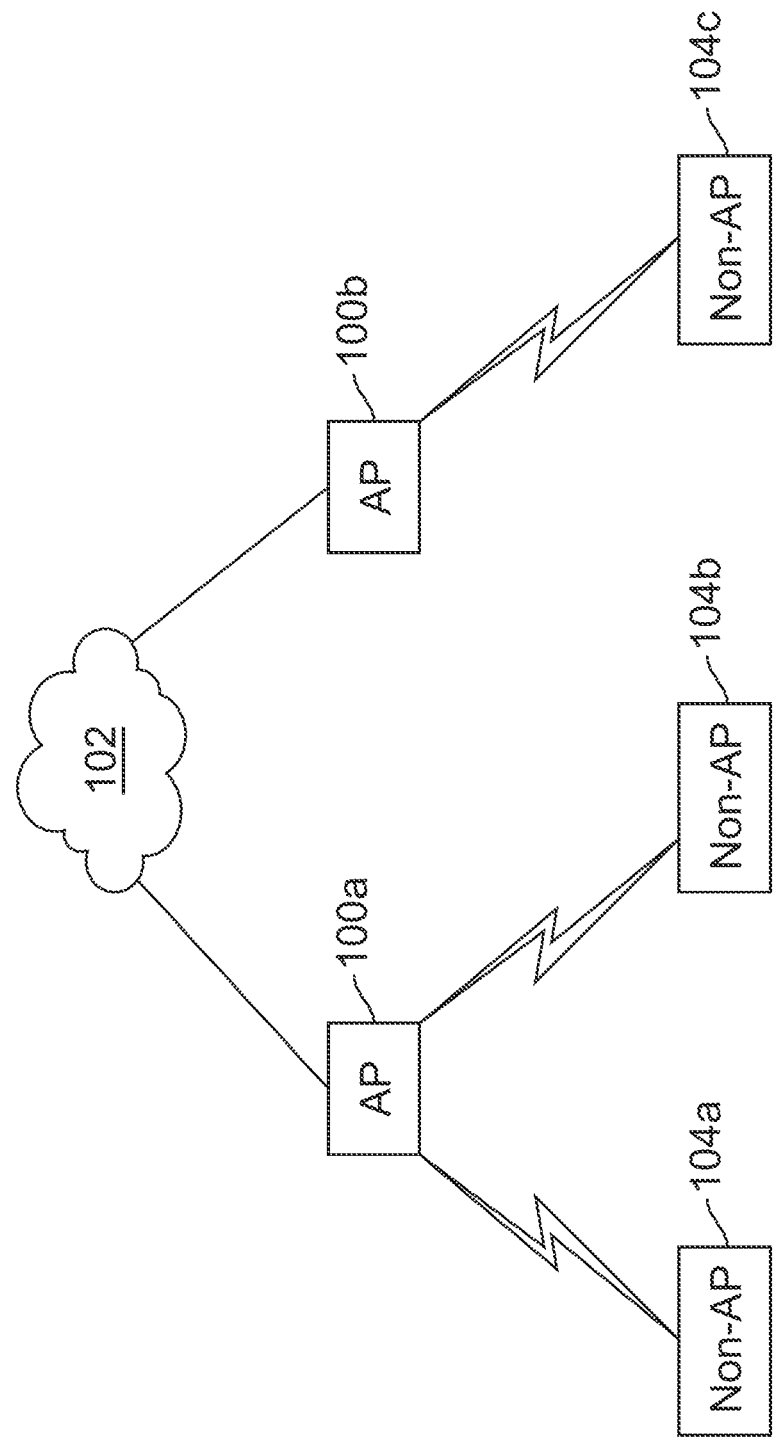
FIG. 1 is a schematic block diagram of a wireless network according to one embodiment.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

Wireless communication may be conducted over a communication channel of a wireless network, such as, for example, a wireless local area network (WLAN). For example, a wireless communication device may wirelessly communicate voice, video, data, and the like (collectively referred to as data) to another device, and vice versa. The wireless communication device may be equipped with one or more physical radio interfaces to the wireless network for sending and receiving data packets. When the device is equipped with multiple (two or more) Wi-Fi interfaces with dedicated wireless communication channels (also referred to as links or stations), the device may be referred to as a multi-link device (MLD). In one embodiment, the MLD executes multi-link operations as set forth in the IEEE 802.11be standard. In this regard the MLD may include multiple physical radio interfaces to the wireless network, but a single interface to an upper communication layer (e.g. a logical link control (LLC) layer). Upper-layer protocols may thus consider the MLD as a single device. In this regard, despite having multiple physical radio interfaces, the MLD may have a single upper layer media access control (MAC) address.

One advantage of the MLD, when compared to a single radio device, is that the MLD may perform channel access and transmit data over multiple radio links. However, because the MLD has at least two embedded radios, it may consume more energy than a single radio device. Thus, it is desirable for the MLD to have a power management mechanism for conserving power and/or making the use of power more efficient.

In current art systems, an MLD may be configured so that each link of the multiple radio links employs an independent power management mechanism. In this regard, each link may be in either the active or power save mode independently from the other links. According to the IEEE 802.11 standard, a link that is in the active mode is always awake for transmitting and receiving data frames. In the power save mode, the link may turn off from time to time in order to conserve energy. When the radio link is off, the link may be in an asleep/doze mode where no data is received or transmitted via the link. Thus, according to current art power management mechanisms for MLDs, although one or more links may be asleep in the power save mode, it is possible for another link to be awake in the active mode. When at least one of the links of the MLD is awake, the upper MAC layer and other functional blocks are turned on and active, thus, consuming power. In a worst-case scenario, power saving may be negligible if sleep cycles of the various links are unsynchronized. Synchronization of the sleep cycles for the various links, however, may be impractical as it may be difficult for an access point (AP) device to trigger the MLD on multiple links at the same time, and/or because the MLD may not expect to gain medium access on multiple links at the same time due to independent traffic congestion conditions and interference conditions on each link. Thus, independent power management by each link according to the current art mechanisms may not always result in saving power for the MLD.

In general terms, embodiments of the present disclosure are directed to power management for a non-AP MLD that allows the MLD to transition to a power save operating mode, referred to as a low power multi-link operation (MLO) operating mode. In one embodiment, when the MLD transitions from a regular/active operating mode to the low power MLO mode, only one link is in a power save mode while the other links are disabled. The one link that is selected to be in the power save mode may be referred to as an anchor link. In regards to the disabled links, in one embodiment, unlike the link in power save mode that is asleep and expected to wake up periodically to monitor, for example, for any beacon frames from the AP device, the links that are disabled are turned off and not expected to wake up. In addition, in one embodiment, the AP device does not attempt transmission and does not provide any information via beacon frames for the MLD on the disabled links.

In one embodiment, the anchor link is selected dynamically each time the MLD transitions to the low power MLO mode. The anchor link may oscillate between an awake state and a doze state during the low power MLO mode. When the anchor link is in the awake state, it may receive information of basic operations of the various links including, for example, traffic information, basic service set (BSS) parameter updates, and the like. In one embodiment, the anchor link may wake up to receive beacon frames with information as to whether there are buffered packets that are destined for the MLD. If the beacon frames indicate that there are no buffered packets, the anchor link my return to the doze state. If there are buffered packets for the MLD, the buffered packets may be received via the anchor link during the awake state, or one or more of the disabled links may be activated (e.g. momentarily) to receive the buffered packets.

In one embodiment, when the MLD transitions to the low power MLO mode, a switch frame indicating the transition is transmitted to an access point on any enabled link. The switch frame may include, for example, an anchor link identifier (ID) if the switch frame is transmitted on a link other than the link selected as the anchor link. In one embodiment, a mapping of different types of traffic (identified by their traffic ID) is updated based on the receipt of the switch frame, so that the traffic IDs are mapped to the anchor link.

When the MLD transitions out of the low power MLO mode to the regular/active operating mode, a second switch frame indicating the transition is transmitted to the access point via the anchor link. In one embodiment, all or a subset of the disabled links may transition to the regular operating mode. When just a subset of the links switch to the regular operating mode, identifiers to the subset of the links are transmitted to the access point in the second switch frame. The mapping of the different types of traffic to the active links are also updated in response to the transition back to the regular operating mode. In one embodiment, the mapping is updated to revert back to the mapping prior to the switching into the low power MLO mode. In one embodiment, the MLD determines the mapping, and the second frame that is transmitted to the access point includes the mapping information.

FIG. 1 is a schematic block diagram of a wireless network according to one embodiment. The wireless network includes access point (AP) devices 100a, 100b (collectively referenced as 100) configured to communicate with a data communications network 102, such as, for example, the Internet. The AP device 100 may be, for example, a router, gateway, or any other network infrastructure configured to provide wireless access to the network 102.

In one embodiment, the AP devices 100 provide wireless access to the network 102 to one or more non-AP devices 104a, 104b, 104c (collectively referenced as 104). The wireless access may be, for example, over a wireless local area network (WLAN). In this regard, a wireless communication standard such as, for example, the IEEE 802.11 standard is employed by the AP and non-AP devices 100, 104 for the wireless communication. The non-AP devices 104 may be, for example, mobile phones, laptops, desktops, printers, television sets, gaming devices, and/or other devices that contend for a wireless channel in the WLAN. In one embodiment, the non-AP devices 104 are multi-link devices configured for low power MLO mode.

Figure 2:
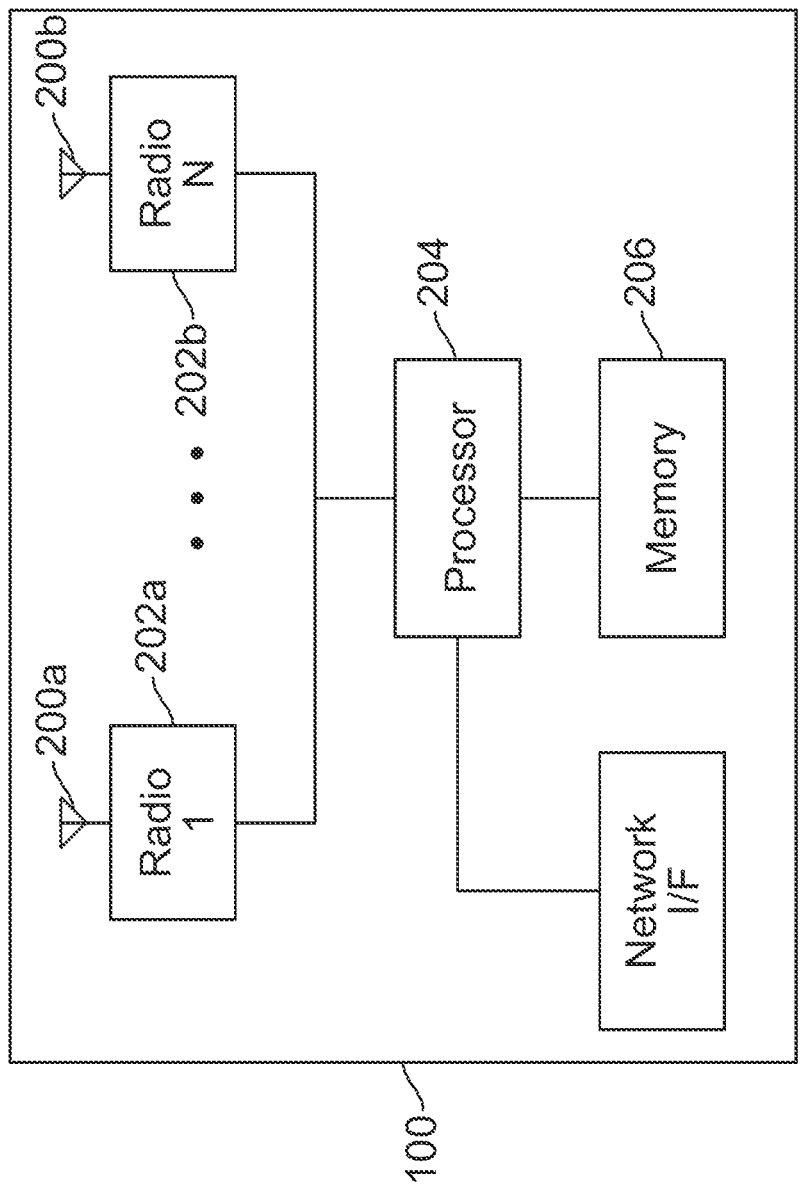
FIG. 2 is a more detailed block diagram of an access point device in the wireless network of FIG. 1, according to one embodiment.

FIG. 2 is a more detailed block diagram of one of the AP devices 100 according to one embodiment. The AP device of FIG. 2 may include, without limitation, one or more antennas 200a-200b (collectively referenced as 200), one or more radios 202a-202b (collectively referenced as 202), a processor 204, and a memory 206. In one embodiment, the one or more radios 202 receive from the antennas 200, incoming radio frequency (RF) signals, such as signals transmitted by the non-AP devices 104. The one or more radios 202 may include RF transceivers configured to modulate the incoming RF signals received by the antennas 200. The transceivers may also be configured to demodulate outgoing signals to be transmitted to the non-AP devices 104 via the antennas 200.

In one embodiment, the one or more radios 202 further include signal processing circuity including a transmit circuity and a receive circuitry. The transmit circuity may be configured to receive analog or digital data from the processor 204, and generate corresponding outgoing signals for further processing by the transceivers. The receive circuitry may be configured to receive the demodulated signals from the transceivers, and generate corresponding data to be provided to the processor 204.

In one embodiment, the processor 204 includes one or more microprocessors, microcontrollers, and/or processing devices for controlling the overall operation of the AP device 100. Such operation may include, for example, providing the non-AP devices 104 wireless access to the data communications network 102. In one embodiment, the processor 204 is configured to buffer radio traffic destined to the non-AP devices 104, and transmit information of such radio traffic to the non-AP devices in beacon frames. When a non-AP device 104 is operating in a low power MLO mode, the AP device 100 may utilize the anchor link identified by the non-AP device 104 for communicating with the non-AP device 104. In one embodiment, the processor 204 is configured to provide recommendation on anchor links that may be selected by the non-AP devices 104.

In one embodiment, the processor 204 is configured to execute computer instructions stored in the memory 206 for implementing the different functionalities of the AP device 100. The memory may include a random access memory (RAM) and read-only memory (ROM). The processor 204 may be configured to move data into or out of the memory 206 when executing a process of the AP device 100.

In one embodiment, the memory 206 stores a mapping of different types of radio traffic that may be identified by a traffic ID (TID), to radio links to be used for transmitting the type of traffic to a non-AP device 104. The TID-to-link mapping may change periodically. For example, the TID-to-link mapping may change when a non-AP device 104 transitions to the low power MLO mode, and all links of the non-AP device are disabled except for the anchor link, which may operate in a power save mode. When the AP-device 100 receives a signal indicating the transition of the non-AP device 104 to the low power MLO mode, the different TIDs may be mapped to the anchor link selected by the non-AP device 104. A remapping may further occur when the non-AP device 104 transitions back to the active operating mode, and one or more of the disabled links are enabled for regular operation.

In one embodiment, the processor 206 is also coupled to a network interface 210. The network interface 210 may be any wired or wireless connection such as, for example, an Ethernet or RF transceiver. In one embodiment, the network interface 210 may allow the access point 100 to communicate over the data communications network 102.

Figure 3:
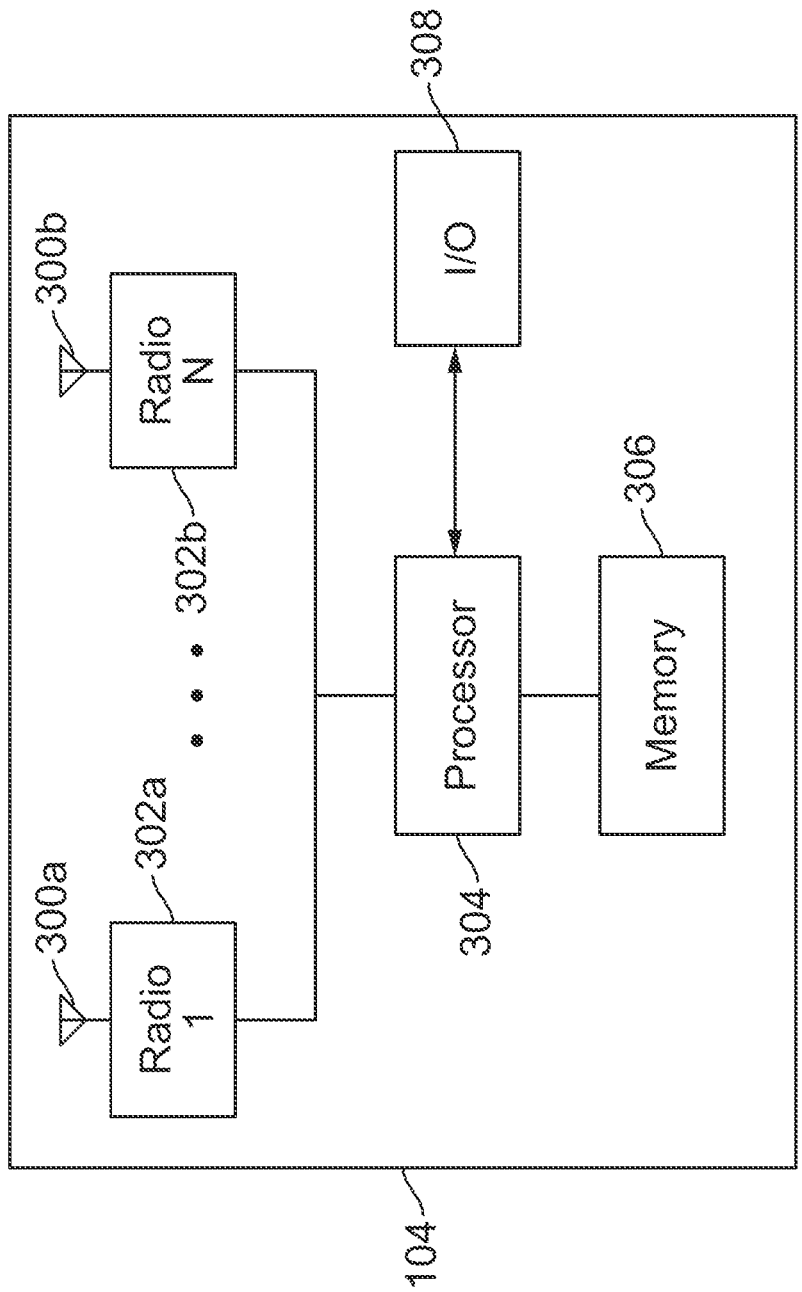
FIG. 3 is a more detailed block diagram of a non-access point device in the wireless network of FIG. 1, according to one embodiment.

FIG. 3 is a more detailed block diagram of one of the non-AP devices 104 according to one embodiment. The non-AP device 104 of FIG. 3 may include one or more antennas 300a-300b (collectively referenced as 300), one or more radios 302a-302b (collectively referenced as 302), a processor 304, memory 306, and one or more input/output (I/O) devices (e.g. microphone, speaker, display, and the like) 308. In one embodiment, the non-AP device 104 is a multi-link device with multiple radios 302, each of the radios having a dedicated Wi-Fi link. The multiple links dedicated to the multiple radios 302 may occupy different bands, such as, for example, 2.4 GHz, 5 GHz, and/or 6 GHz, or may be separate channels on the same band.

In one embodiment, the radios 302 receive from the antennas 300 incoming RF signals carried by one or more of the dedicated Wi-Fi links, such as signals transmitted by one of the AP devices 100. The radios 302 may include radio frequency (RF) transceivers configured to modulate the incoming RF signals received by the antennas 300. The transceivers may also be configured to demodulate outgoing signals to be transmitted to the AP device 100 via the antennas 300.

In one embodiment, the radios 302 further include signal processing circuitry including a transmit circuity and receive circuitry. The transmit circuity may be configured to receive analog or digital voice data from one of the I/O devices 308 (e.g. a microphone), or other outgoing data from the processor 304, and generate corresponding outgoing signals for further processing by the transceiver. The receive circuitry may be configured to receive the demodulated signals from the transceiver, and generate corresponding data to be provided to the processor 304 or one of the I/O devices 308 (e.g. speaker).

In one embodiment, the processor 304 includes one or more microprocessors, microcontrollers, and/or processing devices for controlling the overall operation of the non-AP device 104. Such operation may include, for example, wirelessly communicating voice and other data to the AP devices 100 over one or more of the links. In this regard, the processor 304 may be configured to execute computer instructions stored in the memory 306. The memory may include a random access memory (RAM) and read-only memory (ROM). The processor 304 may be configured to move data into and out of the memory 306 when executing a process of the non-AP device 104.

In one embodiment, the non-AP device 104 is configured with various operating modes, including an active operating mode and a low power MLO operating mode. During the active operating mode, the multiple 302 radios and their dedicated Wi-Fi links may be turned on and awake for receiving and transmitting frames. The processor 304 may switch/transition the non-AP device 104 from the active operating mode to the low power MLO mode in response to detecting a criterion. The criterion may be, for example, a traffic level of the one or more Wi-Fi links. In one embodiment, in response to detecting traffic that is below a threshold amount, the processor 304 selects a Wi-Fi link of one of the radios 302 as the anchor link, and places the radio and the anchor link in a power save mode. All or a subset of the remaining radios and Wi-Fi links may be disabled/turned off for conserving power.

The processor 304 may transmit a notification to the AP device 100 of the transition to the low power MLO mode, and in some instances, an identifier of the selected anchor link. Once in the power save mode, the anchor link may oscillate between an awake and asleep states. In this regard, the anchor link may stay asleep, but wake up periodically to monitor for traffic information from the AP device 100. The anchor link may also receive buffered packets and exchange other messages with the AP device 100 during the moments that it is awake. In this manner, beacon monitoring for all links (including the disabled links) may be performed via a single anchor link that operates in the power save mode. The remaining Wi-Fi links may remain disabled until the non-AP device transitions back to the active operating mode.

Figure 4:
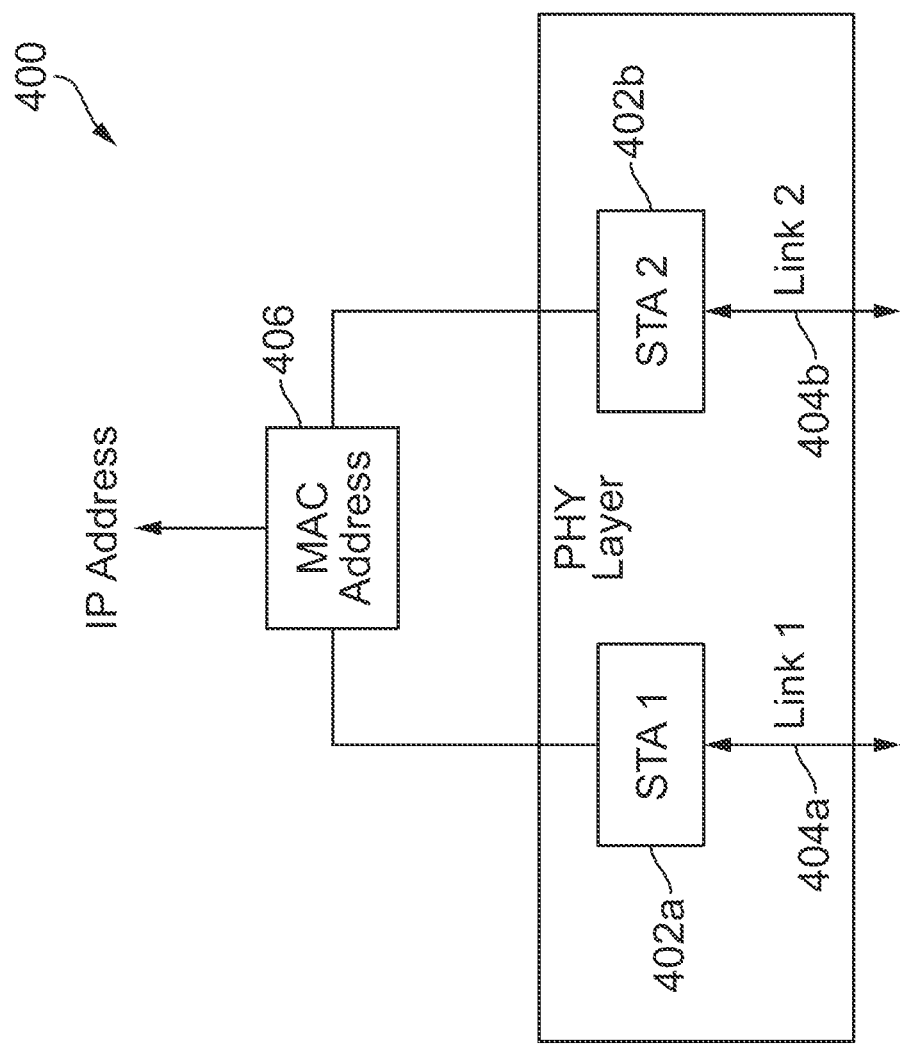
FIG. 4 is a block diagram of a logical architecture of a multi-link device according to one embodiment.

FIG. 4 is a block diagram of a logical architecture of an MLD device 400 according to one embodiment. The MLD device 400 may be one of the non-AP devices 104 configured for low power MLO mode. In one embodiment, the MLD device 400 includes a plurality of logical stations 402a-402b where each station may be deemed to be a separate Wi-Fi device with a physical (PHY) layer interface to the wireless media. Each station 402 may be associated with a separate radio, such as radio 302. In one embodiment, each station 402 has a dedicated Wi-Fi link 404a, 404b (collectively referenced as 404). The MLD device 400 may use the multiple Wi-Fi links 404 for simultaneously transmitting and receiving packets in different bands, or in different channels of the same band. In one embodiment, although each station 402 has a separate PHY layer interface, the MLD device has a single upper layer MAC address 406 and a single interface to the upper layer. Thus, the upper layer protocols may consider the MLD 400 as a single device.

Figure 5:
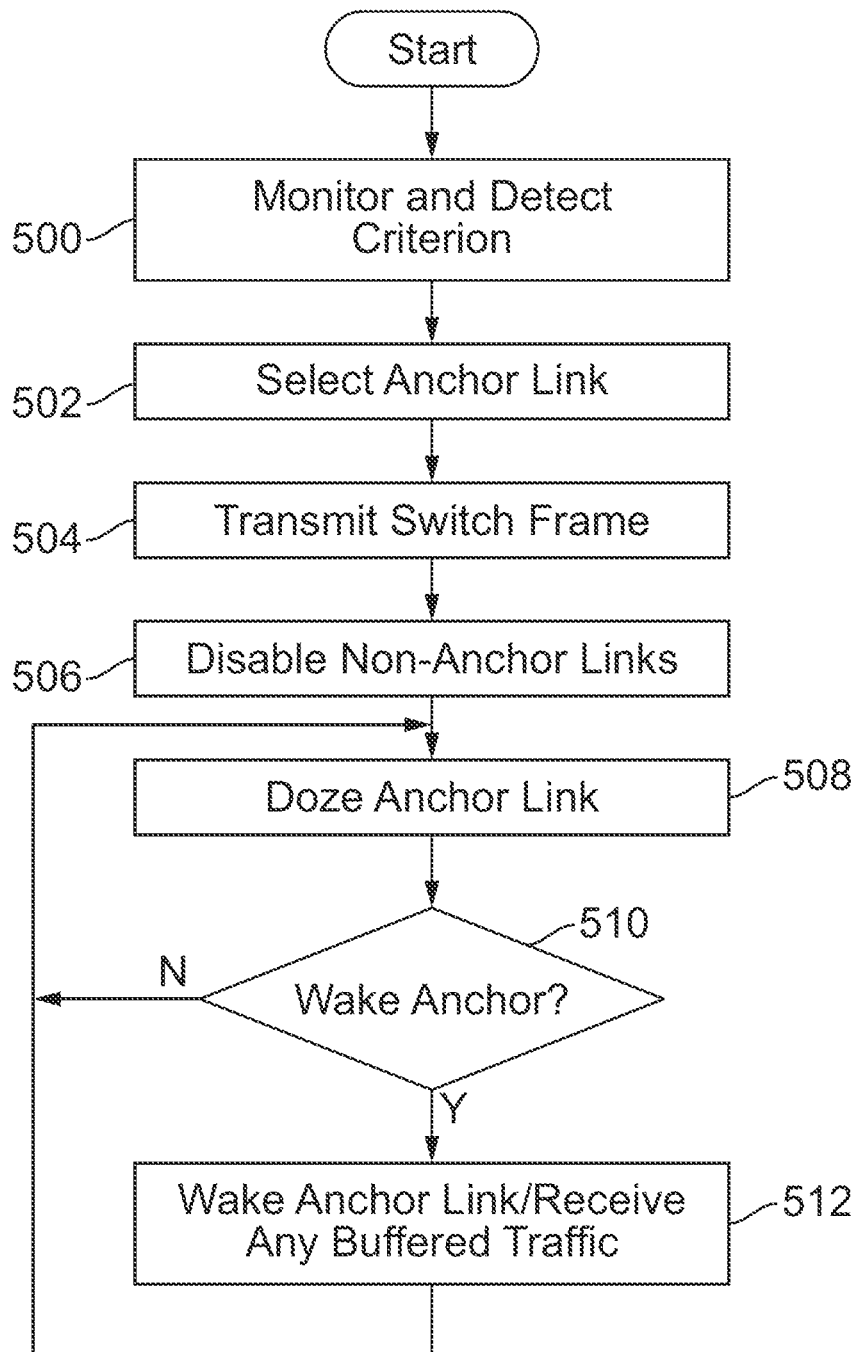
FIG. 5 is a flow diagram of a process for switching the non-AP device of FIG. 3 from an active operating mode to a low power multi-link operating (MLO) mode according to one embodiment.

FIG. 5 is a flow diagram of a process for switching the non-AP device 104 from an active operating mode to a low power MLO mode according to one embodiment. It should be understood that the sequence of steps of the process is not fixed, but can be altered into any desired sequence as recognized by a person of skill in the art.

The process starts, and at block 500, the processor 304 monitors one or more operating conditions until it detects a criterion (e.g. traffic level). For example, the processor 304 may monitor radio traffic to and from the non-AP device 104, and detect that the traffic is below a threshold level.

At block 502, the processor 304 selects one of the multiple Wi-Fi links 404 as the anchor link. In one embodiment, the anchor link is selected dynamically and not determined a priori. In this regard, the processor 304 may execute an internal algorithm for selecting the anchor link. For example, the algorithm may select the anchor link based on factors such as traffic estimates on the various links 404, estimate of resource grants by the AP device 100 on the various links, recommendation by the AP device 100, and/or the like. In regards to the recommendation by the AP device 100, the AP device may suggest one or more links 404 to be the anchor link based on its overall view of the wireless network and the non-AP devices 104 accessing the wireless network. For example, the AP device may suggest an anchor link so that the choice of the anchor link is distributed on different channels for the various non-AP devices 104.

At block 504, the processor 304 transmits a switch frame to the AP device 100 for indicating a switch of its operating mode from an active operating mode (where the links are awake without reverting to a doze state), to the low power MLO operating mode. The switch frame may be transmitted on any one of the Wi-Fi links 404 that is enabled and available for communication, and is not limited to the anchor link. In one embodiment, if the switch frame is not transmitted via the link selected as the anchor link, the switch frame may include an anchor link ID of the anchor link to notify the AP device as to the link that is to act as the anchor link.

In one embodiment, in response to receiving the switch frame, the AP device 100 updates a TID-to-link mapping, so that the different types of traffic (e.g. video traffic, web browsing traffic, audio traffic, etc.) that may be mapped to one or more links that are to be disabled (referred to as non-anchor links), are remapped to the anchor link.

At block 506, the processor 304 disables the non-anchor links by, for example, disabling/turning-off the radios 302 dedicated to the non-anchor links. In one embodiment, all of the Wi-Fi links except for the anchor link are disabled. In one embodiment, only a subset of the Wi-Fi links except for the anchor link are disabled. The processor further switches the operation of the anchor link to a power save mode where the anchor link (and corresponding radio 302) oscillates between doze/asleep and awake states. In this regard, the anchor link is in the doze state at block 508, and the processor 304 monitors, at block 510, whether it detects a trigger for awaking the anchor link. The trigger may be, for example, passage of a certain time period.

If the processor 304 determines that the trigger has been detected, the processor 304 wakes the anchor link in block 512. The anchor link receives beacon frames transmitted by the AP device during the awake period, where the beacon frames indicate whether there are buffered packets destined for the non-AP device 104.

If there are no buffered packets, the anchor link returns to the asleep state at block 508.

If there are buffered packets destined for the non-AP device, the non-AP device may communicate with the AP device 100 via the anchor link for receiving the buffered packets. In one embodiment, the buffered packets are received via the anchor link. In some embodiments, the processor 304 may activate one of the disabled non-anchor links to receive the buffered packets. The anchor link may then return to the asleep state at block 508. In one embodiment, the oscillating between the doze and awake states continues until the processor 304 detects a trigger to switch the non-AP device back to the active operating mode.

Figure 6:
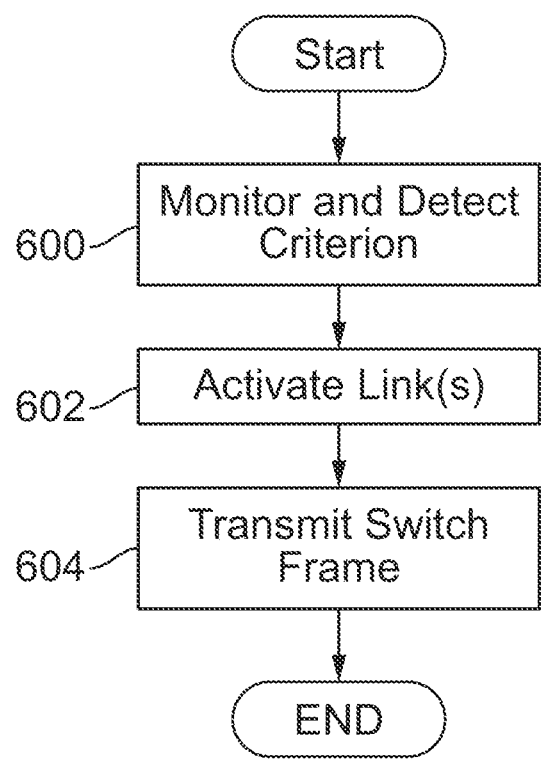
FIG. 6 is a flow diagram of a process for switching the non-AP device of FIG. 3 out of the low power MLO mode according to one embodiment.

FIG. 6 is a flow diagram of a process for switching the non-AP device 104 out of the low power MLO mode, and back to the active operating mode, according to one embodiment. It should be understood that the sequence of steps of the process is not fixed, but can be altered into any desired sequence as recognized by a person of skill in the art.

The processor starts, and at block 600, the processor 304 monitors one or more operating conditions until it detects a criterion (e.g. traffic level). For example, the processor 304 may monitor radio traffic to and from the non-AP device 104, and detect that the traffic is above a threshold level.

At block 602, the processor 304 transitions the anchor link, and/or one or more of the disabled links, into an active state. In one embodiment, all of the disabled links and the anchor link are transitioned to the active state. In one embodiment, only a subset of the disabled links is transitioned to the active state.

At block 604, the processor 304 transmits a switch frame to the AP device 100 via the anchor link indicating the transition to the active mode. In the embodiment where only a subset of the disabled links are transitioned to the active mode, the processor includes in the switch frame, the ID of the links that are transitioned.

In one embodiment, the AP device 100 updates the TID-to-link mapping based on the receipt of the switch frame. The mapping may be updated to revert back to the mapping prior to the switching into the low power MLO mode. In some embodiments, the processor 304 may determine a new mapping (with or without recommendations from the AP device 100), and the new TID-to-link mapping may be transmitted to the AP with the switch frame. For example, the processor 304 may map links associated with higher bands (e.g. 6 Ghz) to traffic that should adhere to a particular quality of service (e.g. video traffic), whereas other types of traffic (e.g. web browsing traffic) may be mapped to links associated with lower bands (e.g. 2.4 Ghz).

In some embodiments, the term processor may refer to one or more processors and/or one or more processing cores. The one or more processors may be hosted in a single device or distributed over multiple devices (e.g. over a cloud system). A processor may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processor, as used herein, each function is performed either by hardware configured, i.e., hard-wired, to perform that function, or by more general-purpose hardware, such as a CPU, configured to execute instructions stored in a non-transitory storage medium (e.g. memory). A processor may be fabricated on a single printed circuit board (PCB) or distributed over several interconnected PCBs. A processor may contain other processing circuits; for example, a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Although exemplary embodiments of a system and method for managing power usage of an MLD device have been specifically described and illustrated herein, many modifications and variations will be apparent to those skilled in the art. Accordingly, it is to be understood that a system and method for managing power usage constructed according to principles of this disclosure may be embodied other than as specifically described herein. The disclosure is also defined in the following claims, and equivalents thereof.

What is claimed is:

1. A method for managing use of power of a wireless communication device configured to communicate over a plurality of radio links, the method comprising:
   selecting a first one of the plurality of radio links, operating in an active mode, as a selected radio link;
   switching operation of the selected radio link from the active mode to a power save mode, and switching operation of a second radio link of the plurality of radio links to a disabled mode;
   transmitting a signal to an access point for indicating the switching of the operation of the selected radio link to the power save mode, wherein in response to the signal, a first type of radio traffic mapped to the second radio link is remapped to the selected radio link for receiving, via the selected radio link, the first type of radio traffic;
   in response to the selected radio link being in the power save mode, transitioning the selected radio link between an asleep state and an awake state; and
   receiving, via the selected radio link, during the awake state, radio traffic information for the plurality of radio links.

2. The method of claim 1, wherein the switching of the operation of the selected radio link and the switching of the operation of the second radio link are based on detecting an amount of radio traffic associated with one or more of the plurality of radio links.

3. The method of claim 1, wherein the selecting of the one of the plurality of radio links is based on a selection algorithm executed by the wireless communication device.

4. The method of claim 1, wherein the selecting of the one of the plurality of radio links is based on a recommendation from a second device.

5. The method of claim 1, the radio traffic information includes information indicative of whether there are buffered data packets destined for the wireless communication device, wherein the radio traffic information is included in a beacon frame received on the selected radio link.

6. The method of claim 1, wherein in the active mode, the selected radio link remains active for receiving and transmitting radio traffic.

7. The method of claim 1 further comprising:
   switching operation of the selected radio link and the second radio link to the active mode.

8. The method of claim 7, wherein the switching of the operation of the selected radio link and the second radio link is based on detecting an amount of radio traffic associated with one or more of the plurality of radio links, wherein the active mode is for keeping the selected radio link and the second radio link active for receiving and transmitting radio traffic.

9. The method of claim 1, wherein the plurality of radio links are Wi-Fi radio links.

10. An apparatus for managing use of power, the apparatus comprising:
    a processor; and
    a memory coupled to the processor, the memory storing computer instructions that, when executed by the processor, cause the processor to:
      select a first one of a plurality of radio links, operating in an active mode, as a selected radio link;
      switch operation of the selected radio link from the active mode to a power save mode, and switch operation of a second radio link of the plurality of radio links to a disabled mode;
      transmit a signal to an access point for indicating the switch of the operation of the selected radio link to the power save mode, wherein in response to the signal, a first type of radio traffic mapped to the second radio link is remapped to the selected radio link for receiving, via the selected radio link, the first type of radio traffic;
      in response to the selected radio link being in the power save mode, transition the selected radio link between an asleep state and an awake state; and
      receive, via the selected radio link, during the awake state, radio traffic information for the plurality of radio links.

11. The apparatus of claim 10, wherein the instructions that cause the processor to switch the operation of the selected radio link and switch the operation of the second radio link are based on detecting an amount of radio traffic associated with one or more of the plurality of radio links.

12. The apparatus of claim 10, wherein the instructions that cause the processor to select the one of the plurality of radio links include a selection algorithm.

13. The apparatus of claim 10, wherein the instructions that cause the processor to select the one of the plurality of radio links include instructions that cause the processor to select the one of the plurality of radio links based on a recommendation from a second device.

14. The apparatus of claim 10, wherein in the active mode, the selected radio link remains active for receiving and transmitting radio traffic.

15. The apparatus of claim 10, wherein the instructions further cause the processor to:
    switch operation of the selected radio link and the selected radio link to the active mode.

16. The apparatus of claim 15, wherein the instructions that cause the processor to switch the operation of the selected radio link and the second radio link are based on instructions that cause the processor to detect an amount of radio traffic associated with one or more of the plurality of radio links, wherein the active mode is for keeping the selected radio link and the second radio link active for receiving and transmitting radio traffic.

17. The apparatus of claim 10, wherein the plurality of radio links are Wi-Fi radio links.

18. A system for managing use of power, the system comprising:
    a responding processor configured to:
      select a first one of a plurality of radio links, operating in an active mode, as a selected radio link;
      switch operation of the selected radio link from the active mode to a power save mode, and switch operation of a second radio link of the plurality of radio links to a disabled mode;
      transmit a signal to an access point for indicating the switch of the operation of the selected radio link to the power save mode, wherein in response to the signal, a first type of radio traffic mapped to the second radio link is remapped to the selected radio link for receiving, via the selected radio link, the first type of radio traffic; and
      in response to the selected radio link being in the power save mode, transition the selected radio link between an awake state and an asleep state; and
    a transmitting processor configured to:

receive information on the selected radio link;
retrieve radio traffic information for the plurality of radio links; and
transmit the radio traffic information on the selected radio link.

\* \* \* \* \*